United States Patent
Moro et al.

(10) Patent No.: US 9,835,898 B2
(45) Date of Patent: Dec. 5, 2017

(54) DISPLAY UNIT

(71) Applicant: Sony Corporation, Tokyo (JP)

(72) Inventors: Shuji Moro, Tokyo (JP); Nobutake Iwase, Tokyo (JP); Hisanori Tsuboi, Kanagawa (JP); Kenji Hata, Kanagawa (JP); Kazuyuki Uchihira, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/346,339

(22) Filed: Nov. 8, 2016

(65) Prior Publication Data

US 2017/0052407 A1 Feb. 23, 2017

Related U.S. Application Data

(63) Continuation of application No. 14/283,542, filed on May 21, 2014, now Pat. No. 9,519,177.

(30) Foreign Application Priority Data

May 30, 2013 (JP) .................................. 2013-114522

(51) Int. Cl.
| | | |
|---|---|---|
| G02F 1/1333 | (2006.01) | |
| G02F 1/1335 | (2006.01) | |
| G02F 1/1339 | (2006.01) | |

(52) U.S. Cl.
CPC ...... *G02F 1/133514* (2013.01); *G02F 1/1339* (2013.01); *G02F 1/13394* (2013.01); *G02F 1/133308* (2013.01); *G02F 1/133502* (2013.01); *G02F 1/133608* (2013.01); *G02F 2001/133311* (2013.01); *G02F 2001/133331* (2013.01); *G02F 2202/023* (2013.01); *G02F 2202/28* (2013.01)

(58) Field of Classification Search
CPC .................................................... G02F 1/1339
See application file for complete search history.

(56) References Cited

U.S. PATENT DOCUMENTS

| | | | | |
|---|---|---|---|---|
| 8,936,839 B2* | 1/2015 | Fujii | ........................ | C09J 4/00 |
| | | | | 428/1.1 |
| 2004/0169809 A1* | 9/2004 | Yamabuchi | ....... | G02F 1/133351 |
| | | | | 349/153 |
| 2005/0083465 A1* | 4/2005 | Niiyama | ................... | G09F 9/35 |
| | | | | 349/122 |
| 2009/0186552 A1* | 7/2009 | Shinya | .............. | G02F 1/133502 |
| | | | | 445/58 |
| 2010/0003425 A1* | 1/2010 | Kamata | ............. | G02F 1/133308 |
| | | | | 428/1.5 |

(Continued)

FOREIGN PATENT DOCUMENTS

| | | |
|---|---|---|
| JP | 03-204616 | 6/1991 |
| JP | 06-337411 A | 6/1994 |

(Continued)

*Primary Examiner* — Phu Vu
(74) *Attorney, Agent, or Firm* — Lerner, David, Littenberg, Krumholz & Mentlik, LLP

(57) ABSTRACT

Provided is a display unit that includes: a display panel having a pair of substrates that are bonded to each other in a seal region along an outer edge of the display panel; a transparent plate facing the display panel; an optical film provided on a surface of the display panel which faces the transparent plate, and having an outer edge positioned over the seal region; and a resin layer sandwiched between the optical film and the transparent plate.

18 Claims, 11 Drawing Sheets

(56) References Cited

U.S. PATENT DOCUMENTS

| | | | | |
|---|---|---|---|---|
| 2010/0097552 A1* | 4/2010 | Shinya | ................... | C09J 109/00 349/122 |
| 2010/0149452 A1* | 6/2010 | Harada | ................. | G02F 1/1333 349/58 |
| 2010/0231821 A1* | 9/2010 | Tsuji | ................. | G02F 1/133308 349/58 |
| 2010/0231837 A1* | 9/2010 | Harada | ............. | G02F 1/133308 349/122 |
| 2013/0302539 A1* | 11/2013 | Fujii | .................... | C08F 220/10 428/1.54 |

FOREIGN PATENT DOCUMENTS

| | | |
|---|---|---|
| JP | 2005-055641 A | 3/2005 |
| JP | 2008-281997 A | 11/2008 |

* cited by examiner

DISPLAY UNIT

CROSS REFERENCE TO RELATED APPLICATIONS

The present application is a continuation of U.S. patent application Ser. No. 14/283,542, filed on May 21, 2014, which claims the benefit of Japanese Priority Patent Application JP2013-114522 filed May 30, 2013, the entire contents of which are incorporated herein by reference.

BACKGROUND

The present disclosure relates to a display unit for, for example, television apparatuses.

In recent years, display units, such as liquid crystal and organic electroluminescence (EL) display units, have been used as display monitors for thin-screen television apparatuses, notebook personal computers, car navigation systems, and the like. Some known types of display units are equipped with front plates in order to protect their front surfaces or enhance their appearances. Specifically, these front plates are made of plastic, glass, or some other transparent plate, and attached to the front (display) surfaces of the display panels (for example, see Japanese Unexamined Patent Application Publications No. H03-204616, H06-337411, 2005-55641, and 2008-281997).

For the purpose of enhancing an image quality or appearance, a front plate, as described above, may undergo a light shielding treatment in a region facing a non-display (frame) portion of a display panel. More specifically, a light shielding layer may be formed in a frame-shaped peripheral region on a front panel, for example, by depositing or printing a light-shielding material or bonding an opaque sheet material.

Japanese Unexamined Patent Application Publication No. H03-204616 aims to prevent an image quality from being lowered by light reflected at the interface between a front plate and a display panel, and proposes interposing a transparent substance with an adjusted refractive index between them. Japanese Unexamined Patent Application Publications No. H06-337411, 2005-55641, and 2008-281997 describe a liquid, a gel sheet, an adhesive sheet, a light curing resin, and the like, as examples of the transparent substance above.

SUMMARY

When a light curing resin is used as the transparent substance, for example, it may be disposed between the display panel and the front plate, and then cured by irradiating the front or side of the front plate with light. Use of such a light curing resin eliminates a risk of causing leaks, as opposed to a case of using a liquid material, and does not easily permit the entry of dust or the generation of air bubbles during manufacturing processing, as opposed to a case of using an adhesive sheet. In addition, use of a light curing resin enables the display panel and the front plate to be bonded to each other, independently of strain on the display panel, a step structure thereof, and the like.

However, if a resin layer made of a light curing resin is interposed between a front plate and a liquid crystal display panel that has surfaces to which optical films such as polarizing plates are bonded, some disadvantages may arise; for example, frame-shaped display unevenness appears at the periphery of an image display section, geometric strain occurs on the front surface of the front panel, and so on.

It is desirable to provide a display unit that suppresses the generation of display unevenness and strain on the front surface of a front panel.

A first display unit according to an embodiment of the present disclosure includes: a display panel having a pair of substrates, in which the substrates are bonded to each other in a seal region along an outer edge of the display panel; a transparent plate facing the display panel; an optical film provided on a surface of the display panel which faces the transparent plate, and having an outer edge positioned over the seal region; and a resin layer sandwiched between the optical film and the transparent plate.

According to the first display unit in the embodiment of the present disclosure, the outer edge of the optical film is positioned over the seal region of the display panel. Since the pair of substrates are fixed to each other in the seal region, even when the pair of substrates undergo external force from the outer edge of the optical film, no strain occurs on the display panel easily. Moreover, since the difference in occupied area between the display panel and the optical film decreases, part of the resin layer which protrudes from the outer edge of the optical film and makes contact with the display panel is made relatively small in area.

A second display unit according to an embodiment of the present disclosure includes: a display panel; a transparent plate facing the display panel; an optical film provided on a surface of the display panel which faces the transparent plate; and a resin layer sandwiched between the optical film and the transparent plate, and having an outer edge positioned on inner side of an outer edge of the optical film.

According to the second display unit in the embodiment of the present disclosure, the outer edge of the resin layer is positioned on the inner side of the outer edge of the optical film. Therefore, the resin layer does not protrude from the optical film, and has a substantially uniform thickness as a whole.

A display unit according to an embodiment of the present disclosure makes it possible to reduce load stress locally applied to a display panel and a transparent plate. Consequently, it is possible to provide a display unit that is capable of supporting a slim design of a transparent plate and reducing display unevenness.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some embodiments of the present disclosure will be described below in detail, with reference to the accompanying drawings. The description will be given in the following order. It is to be noted that the present disclosure is not limited to examples that will be described below, and known components may be added to the examples as appropriate.
1. First embodiment and its modifications
(An exemplary display unit in which an outer edge of an optical film is positioned over a seal region of a display panel.)
2. Second embodiment and its modification
(An exemplary display unit in which an outer edge of a resin film is positioned on the inner side of the outer edge of an optical film.)
3. Examples First Embodiment (Configuration of Display Unit 1)

Figure 1:
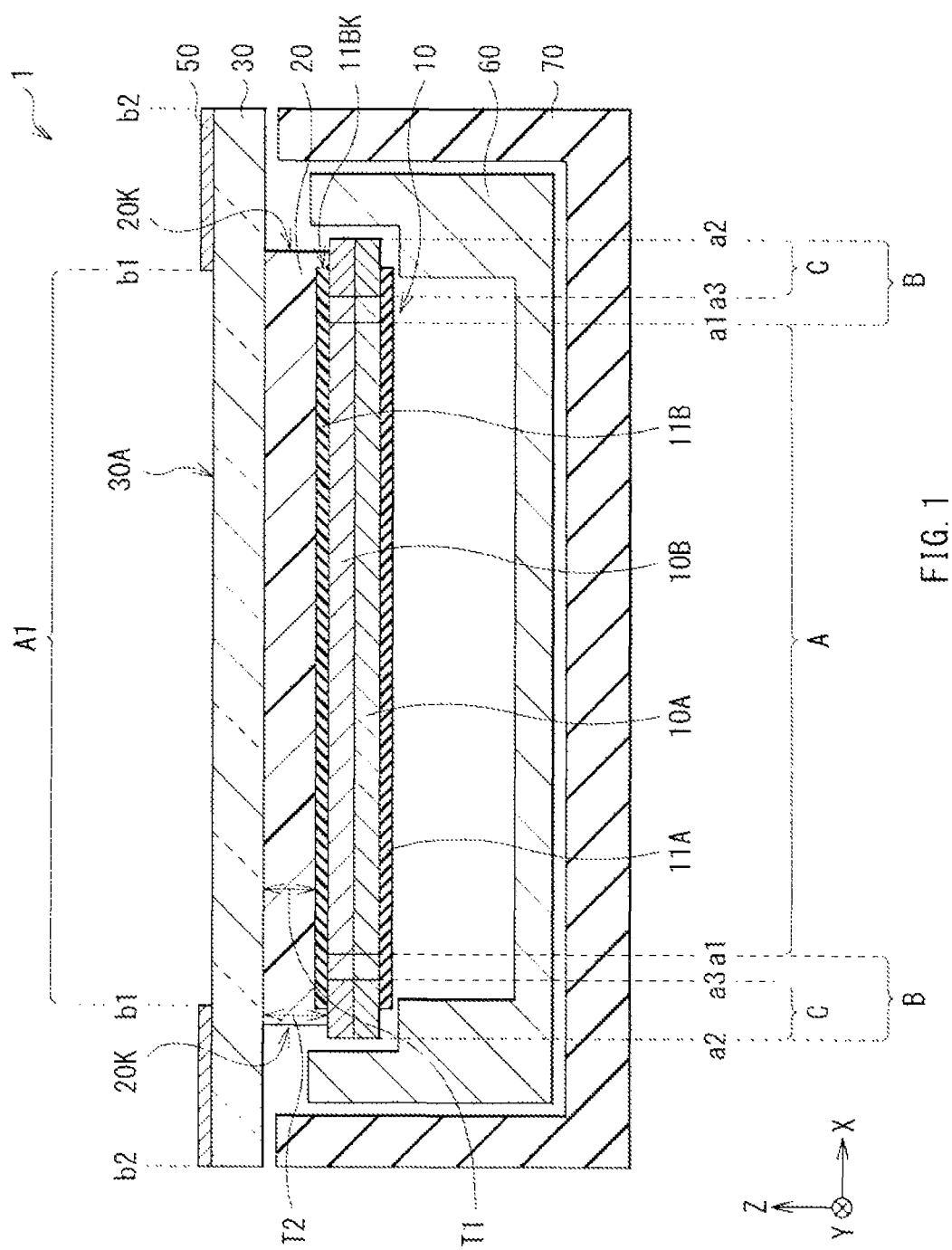
FIG. 1 is a cross-sectional view showing a configuration of a display unit according to a first embodiment of the present disclosure.

FIG. 1 schematically shows a cross-sectional configuration of a display unit 1 according to a first embodiment of the present disclosure. The display unit 1 may be a liquid crystal display unit which may be used as a display monitor for television apparatuses, notebook personal computers, car navigation systems, and the like. In the display unit 1, a resin layer 20, a transparent substrate 30, and a light-shielding layer 50 are provided, in this order, on the front surface (light-emitting surface) of a display panel 10. A backlight unit 60 is provided under the rear surface (light incident surface) of the display panel 10. Both the display panel 10 and the backlight unit 60 are arranged within an exterior member 70.

The display panel 10 is a liquid crystal display panel that displays images on the basis of illumination light from the backlight unit 60, and employs an active matrix system in which an image is displayed for each pixel on the basis of image signals transmitted from a data driver (not shown) and in response to drive signals supplied from a gate driver (not shown). The display panel 10 may have pixels (not shown), for example, 3840 or more of which are arranged in an X direction and 2160 or more of which are arranged in a Y direction. Each pixel includes red, green, and blue sub-pixels that emit red light, green light, and blue light, respectively. The display panel 10 includes a drive substrate 10A, a counter substrate 10B, and a liquid crystal layer (not shown) encapsulated therebetween. Film-shaped polarizing plates 11A and 11B as optical films are bonded to the outer surfaces of the drive substrate 10A and the counter substrate 10B, respectively. The drive substrate 10A includes a thin film transistors (TFTs), a drive circuit, and a wiring substrate arranged, for example, on a glass substrate; the thin film transistors (TFTs) drive the corresponding pixels, the drive circuit supplies the image signals and the like to the pixels, and the wiring substrate is connectable to one or more exterior devices. The counter substrate 10B includes color filters (not shown) for the three primary colors (R, G, and B) formed for each pixel, for example, on a glass substrate. The liquid crystal layer used contains a nematic liquid crystal that operates, for example, in vertical alignment (VA), twisted nematic (TN), or in plane switching (IPS) mode. The drive substrate 10A and the counter substrate 10B do not necessarily have to be arranged in this order. The color filters do not necessarily have to be provided, or may be provided in the drive substrate 10A instead of the counter substrate 10B. In addition, the drive elements may be any given elements other than TFTs.

Figure 2:
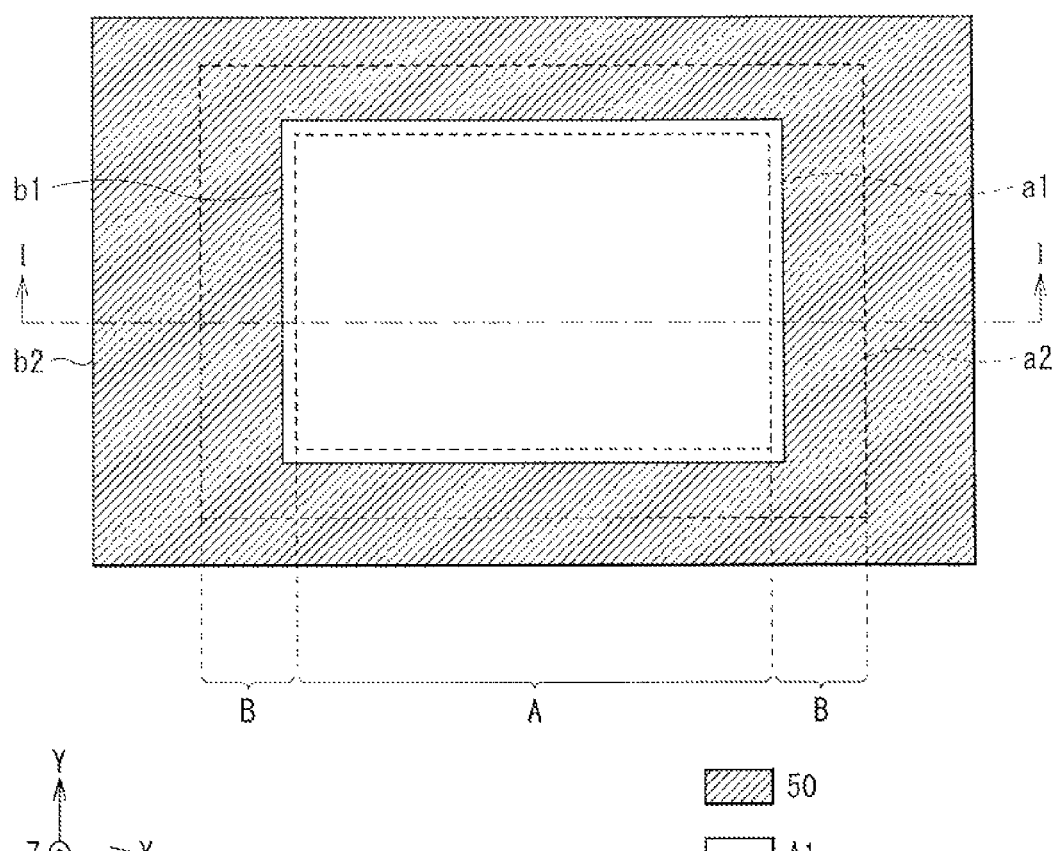
FIG. 2 is a plan view showing a configuration of the display unit in FIG. 1 as seen from a light-shielding layer side.

FIG. 2 shows a planar configuration of the display unit 1 in FIG. 1 as seen from the light-shielding layer 50 side. FIG. 1 shows a cross section taken along a cut line I-I in FIG. 2 as seen in the arrow direction. The display panel 10 has a display region A (a rectangular region surrounded by an outer edge a1) and a surrounding region B (a frame-shaped region defined between the outer edge a1 and an outer edge a2 of the display panel 10) that surrounds the display region A. The display region A contains the plurality of pixels arranged in a matrix fashion; the surrounding region B contains the drive circuit that drives the pixels, the wiring substrate that is connectable to one or more exterior devices, and the like, as described above. The drive substrate 10A is bonded, for example, with an adhesive (not shown) to the counter substrate 10B, in a seal region C contained in the surrounding region B along the outer edge a2. The polarizing plate 11B has an outer edge 11BK positioned over the seal region C. In other words, the outer edge 11BK of the polarizing plate 11B is positioned between an inner edge a3 of the seal region C and the outer edge a2 of the display panel 10. In this embodiment, the seal region C corresponds to part of the surrounding region B surrounding the display region A; however it may correspond to the whole of the surrounding region B.

The resin layer 20 has a function of reducing light reflected at the interfaces between the display panel 10 and the transparent substrate 30, and is provided to increase a shock tolerance. The resin layer 20 may be made of, for example, an ultraviolet or visible light curing silicone-based, epoxy-based, or acrylic-based resin, and desirably it may be made of an acrylic-based resin. The acrylic resin may desirably have a resin composition that contains an oligomer, an acrylic monomer, a photopolymerization initiator, and a plasticizer. Examples of the oligomer may include polyurethane acrylate, polyisoprene-based acrylate, polyester acrylate, and epoxy acrylate. Preferable examples of the acrylic monomer may include iso-bornyl acrylate, benzyl acrylate, 2-hydro-xyethyl methacrylate, and other monofunctional acrylic monomers.

It is desirable for the resin layer 20 made of the above to have a cure shrinkage ratio of about 3% or less upon curing of the resin, in order to reduce display unevenness, and to have a storage elasticity modulus of about $1.0 \times 10^6$ Pa or less after the curing of the resin.

The thickness of the resin layer 20 may desirably be about 20 μm to 5 mm, more desirably, about 20 μm to 500 μm. If the thickness of the resin layer 20 is less than 20 μm, its adhesion strength may decrease or its manufacturing capability may be lowered. If the thickness of the resin layer 20 exceeds 500 μm, a sense of depth of a displayed image may become excessively prominent, the appearance may be worsened, the increased use of the resin may cause the cost increase, and the overall weight of the display unit 1 may increase. Furthermore, the resin layer 20 desirably covers not only the upper surface of the polarizing plate 11B but also the outer edge 11BK, as shown in FIG. 1. This prevents the polarizing plate 11B from being exposed, thereby sufficiently protecting the polarizing plate 11B.

The transparent substrate 30 is a so-called front panel, which is provided to protect the front surface of the display panel 10 and to enhance an appearance. The transparent substrate 30 may have a thickness of, for example, about 0.2 mm to 5.0 mm, and be made of, for example, glass or plastic. Examples of the plastic may include acrylic and polycarbonate. However, the transparent substrate 30 may desirably be made of a glass material because of its dimensional stability, in particular, when being used in a large-sized display unit. The front surface (on the viewer's side or light-emitting side) of the transparent substrate 30 may undergo a non-reflective or low-reflective treatment.

The transparent substrate 30 is larger in overall size than the display panel 10, and therefore an outer edge b2 of the transparent substrate 30 protrudes outwardly from the outer edge a2 of the display panel 10, for example, by about 5 mm to 100 mm. A rectangular region in the transparent substrate 30 which faces the display region A serves as a light transmitting section A1 through which light passes.

The light-shielding layer 50 is provided in a frame-shaped region on a front surface 30A of the transparent substrate 30 which faces the surrounding region B, in order to enhance an image quality and appearance. The thickness of the light-shielding layer 50 may be, for example, about 0.1 μm to 100 μm, and configured with an opaque material made of, for example, carbon black, metal, or some other material containing a pigment, a colorant, or the like. Preferably, an inner edge b1 of the light-shielding layer 50 is positioned on the outer side of the outer edge a1 between the display region A and the surrounding region B in the display panel 10. This makes it possible to prevent the pixels in the display panel 10 from being hidden by the light-shielding layer 50, when a viewer sees the display unit 1 in a certain oblique direction.

The backlight unit 60 has, for example, a fluorescent tube such as a cold cathode fluorescent lamp (CCFL) or light emitting diodes (LEDs) as a light source, and illuminates the rear of the display panel 10 directly or through an optical member such as an optical waveguide.

The display unit 1 configured above may be manufactured in the following manner.

Figure 3A:
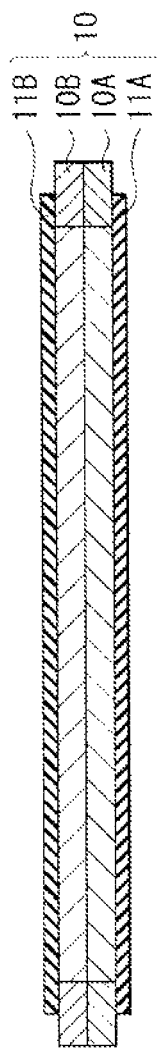
FIG. 3A is a cross-sectional view showing one step of a method of manufacturing the display unit in FIG. 1.
Figure 3B:
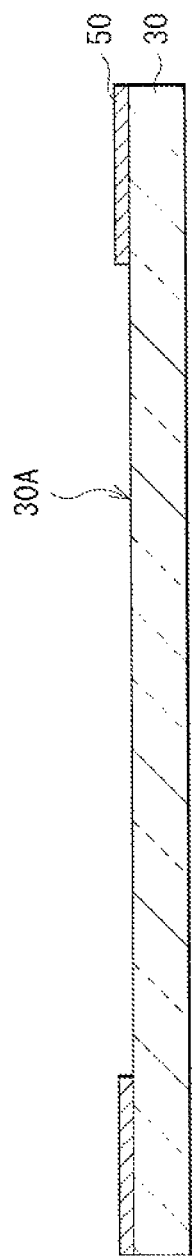
FIG. 3B is a cross-sectional view showing another step of the method of manufacturing the display unit in FIG. 1.
Figure 4:
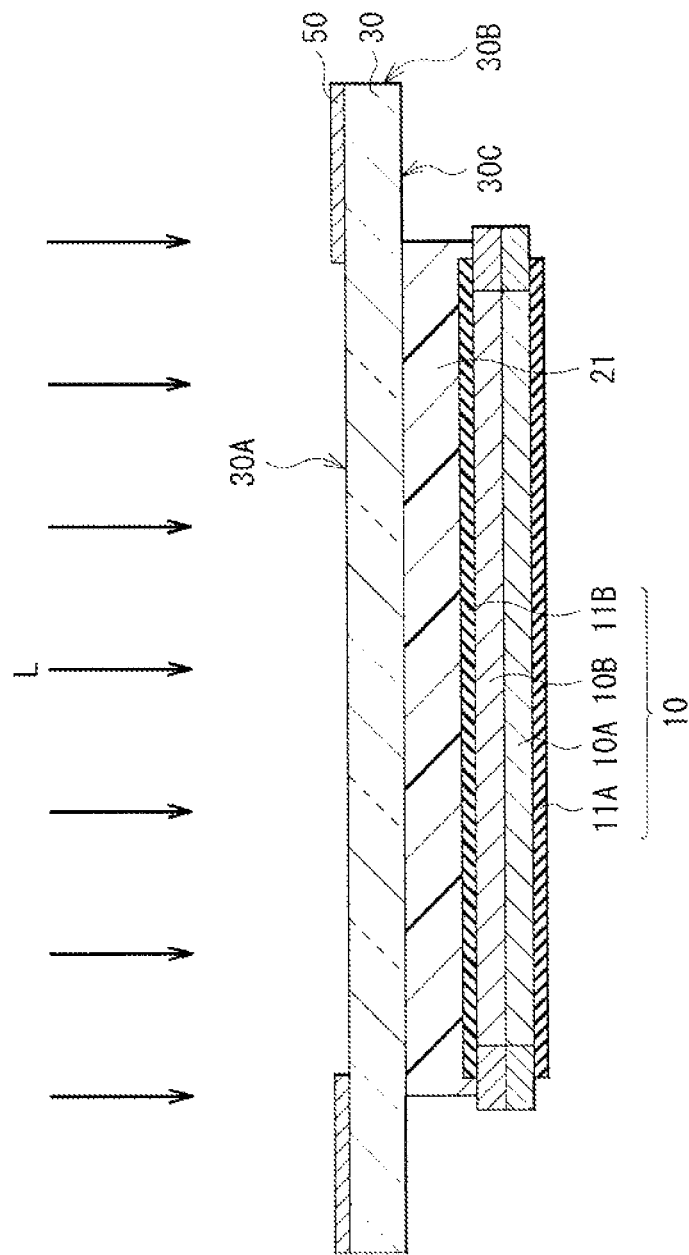
FIG. 4 is a cross-sectional view showing a step following the step in FIG. 3.

FIGS. 3A, 3B, and 4 show part of the method of manufacturing the display unit 1 in order of process. First, the display panel 10 is fabricated, as shown in FIG. 3A. More specifically, the drive substrate 10A in which the TFTs, the drive circuits, and the like are disposed is bonded to the counter substrate 10B in which the color filters are arranged, with the liquid crystal layer (not shown) therebetween. Then, the polarizing plates 11A and 11B are bonded to the outer surfaces of the drive substrate 10A and the counter substrate 10B, respectively.

Meanwhile, as shown in FIG. 3B, the light-shielding layer 50 is formed on the front surface 30A of the transparent substrate 30. More specifically, the light-shielding layer 50 is provided, for example, by being printed on the front surface 30A with a binder in which a predetermined opaque material is dispersed or dissolved or by being deposited directly on the front surface 30A. Alternatively, for example, a transparent film 51 on which the light-shielding layer 50 may be printed may be bonded to the entire front surface 30A of the transparent substrate 30.

The front surface 30A (on the viewer's side) of the transparent substrate 30 may undergo a non-reflective or low-reflective treatment. This treatment may be performed, for example, by depositing a non-reflective or low-reflective material on the front surface 30A, coating the front surface 30A with the non-reflective or low-reflective material, or bonding a non-reflective or low-reflective film to the front surface.

Followed by, as shown in FIG. 4, the display panel 10 and the transparent substrate 30, which have been fabricated in the above manner, are stacked on each other, for example, with a light curing liquid resin 21 therebetween. Then, the front surface 30A of the transparent substrate 30 is irradiated with light L having a predetermined wavelength, such as ultraviolet or visible light, which enables the resin 21 to be cured. Specifically, light with a wavelength that corresponds to the absorption wavelength for the photopolymerization initiator contained in the resin 21 may be used. In this case, for example, a lamp with a center emission wavelength of about 365 nm or 405 nm, or an LED with an emission wavelength of about 365 nm or 405 nm may be used, for the viewpoint of productivity. The illuminance or light amount of the light L may be determined, for example, depending on compositions contained in the material of the resin 21, or the thickness of the resin 21. More specifically, the accumulated light amount and illuminance of the light L may preferably be set so as to fall within ranges from about 1500 mJ/cm$^2$ to 15000 mJ/cm$^2$ and 10 mW/cm$^2$ to 500 mW/cm$^2$, respectively. Preferably the resin 21 may be applied such that its thickness becomes as uniform as possible, for example, with a slit coating, roll coating, screen print, or stencil print method.

After the transparent substrate 30 and the display panel 10 have been bonded to each other with the resin layer 20 therebetween in the above manner, the bonded display panel 10 and the transparent substrate 30 are placed within the exterior member 70, together with the backlight unit 60. Through the above processing, the display unit 1 shown in FIG. 1 has been completed.

(Function and Effect of Display Unit 1)

When light from the backlight unit 60 enters the display panel 10 in the display unit 1, this incident light passes through the polarizing plate 11A. Then, the incident light passes through the liquid crystal layer (not shown) while being modulated for each pixel on the basis of an image voltage applied between the drive substrate 10A and the counter substrate 10B. After having passed through the liquid crystal layer, the light passes through the counter substrate 10B with the color filters (not shown), and then is output from the polarizing plate 11B as color display light.

In the display panel 10 of the display unit 1, the polarizing plate 11B is provided on the surface of the counter substrate 10B which faces the transparent substrate 30, and the outer edge 11BK of the polarizing plate 11B is positioned over the seal region C. When the resin 21 is cured to form the resin layer 20, its volume decreases. At this time, external force is applied to the counter substrate 10B, and this force would be maximized at the outer edge 11BK of the polarizing plate 11B and its surrounding area. The display panel 10, however, has a greater strength in the seal region C than in another region, because the drive substrate 10A and the counter substrate 10B are fixed to each other in the seal region C with the liquid crystal layer encapsulated therebetween. Therefore, for example, even when both the drive substrate 10A and the counter substrate 10B undergo external force from the outer edge 11BK of the polarizing plate 11B in response to the shrinkage of the resin layer 20, no strain occurs on the display panel 10 easily. As a result, the distance (cell gap) between the drive substrate 10A and the counter substrate 10B is kept constant, so that display unevenness is less likely to be generated.

Figure 10:
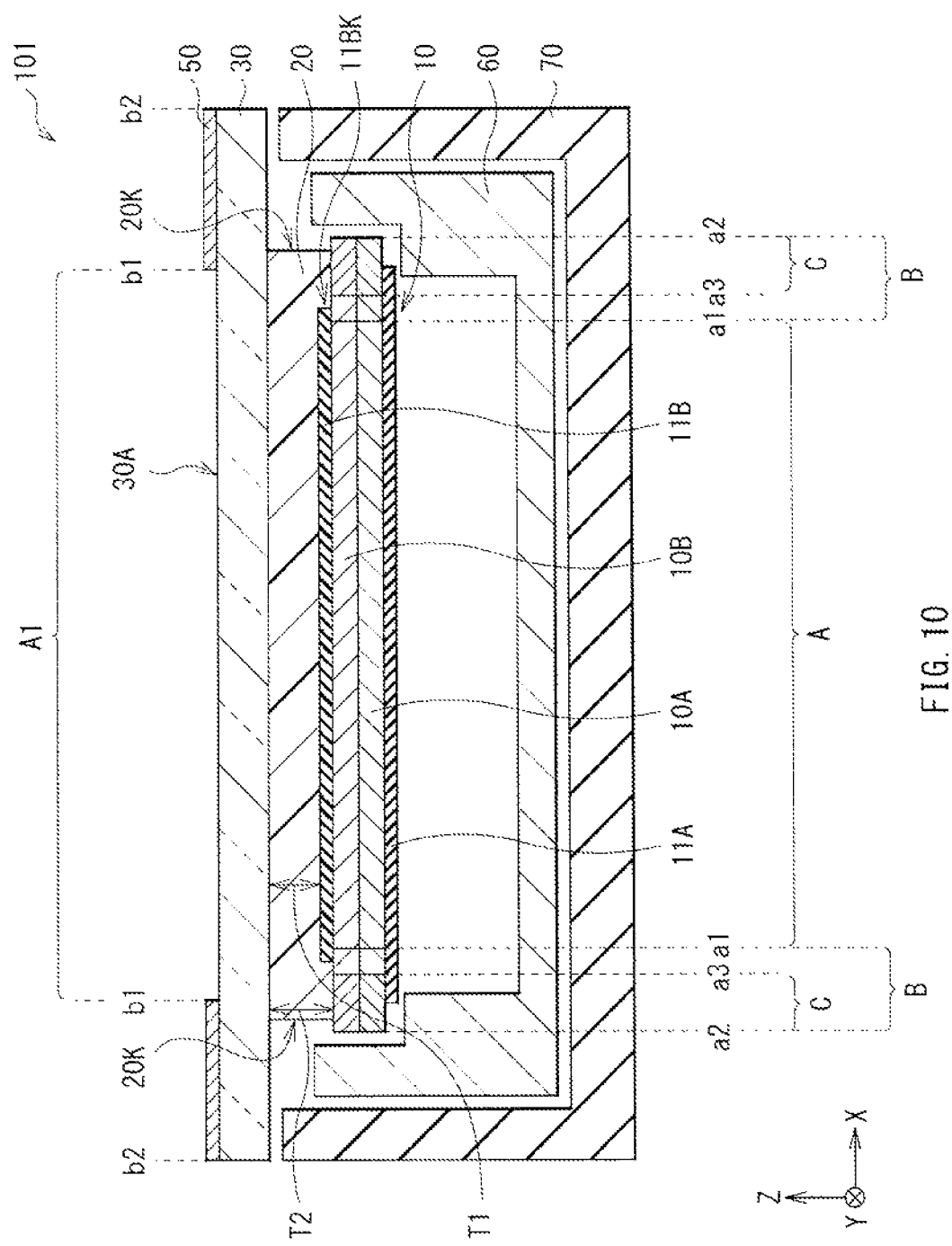
FIG. 10 is a cross-sectional view showing a configuration of a display unit according to a comparative example.

In contrast, in a display unit 101 of a comparative example, as shown in FIG. 10, an outer edge 11BK of a polarizing plate 11B is positioned on the inner side of a seal region C (on a display region side). In other words, the outer edge 11BK is positioned in a region corresponding to a section other than that in which a drive substrate 10A is fixed to a counter substrate 10B. When both the drive substrate 10A and the counter substrate 10B undergo external force from the outer edge 11BK of the polarizing plate 11B in response to the shrinkage of a resin layer 20, strain occurs on the display panel 10, possibly causing display unevenness. Moreover, in a resin layer 20 of the display unit 101, a thickness T1 of a central region is larger than a thickness T2 of a peripheral region. Therefore, when a resin layer 21 is cured to form the resin layer 20, the peripheral section with the larger thickness T2 is shrunk more greatly. As a result, stress is generated in the resin layer 20.

In the display unit 1 in the present embodiment, the outer edge 11BK of the polarizing plate 11B is positioned corresponding to the seal region C, and area in which a peripheral region having a thickness T2 is formed is smaller than that in the display unit 101. Since the difference in occupied area between the display panel 10 and the polarizing plate 11B is smaller than that in the display unit 101, area in which the resin layer 20 protruding from the outer edge 11BK of the polarizing plate 11B is in contact with the display panel 10 becomes relatively small. It is thus possible to reduce stress generated in the resin layer 20, thereby avoiding the generation of the display unevenness.

As described above, the display unit 1 in this embodiment is capable of reducing load stress locally applied to the display panel 10 and the transparent substrate 30, thereby successfully supporting a slim design of both the display panel 10 and the transparent substrate 30 and reducing display unevenness. In general, high resolution display panels in which 3840 or more pixels are arranged in an X direction and 2160 or more pixels are arranged in a Y direction tend to cause display unevenness at its periphery. The display unit 1 in this embodiment still becomes effective in improving this disadvantage.

First Modification of First Embodiment (Configuration of Display Unit 1A)

Figure 5:
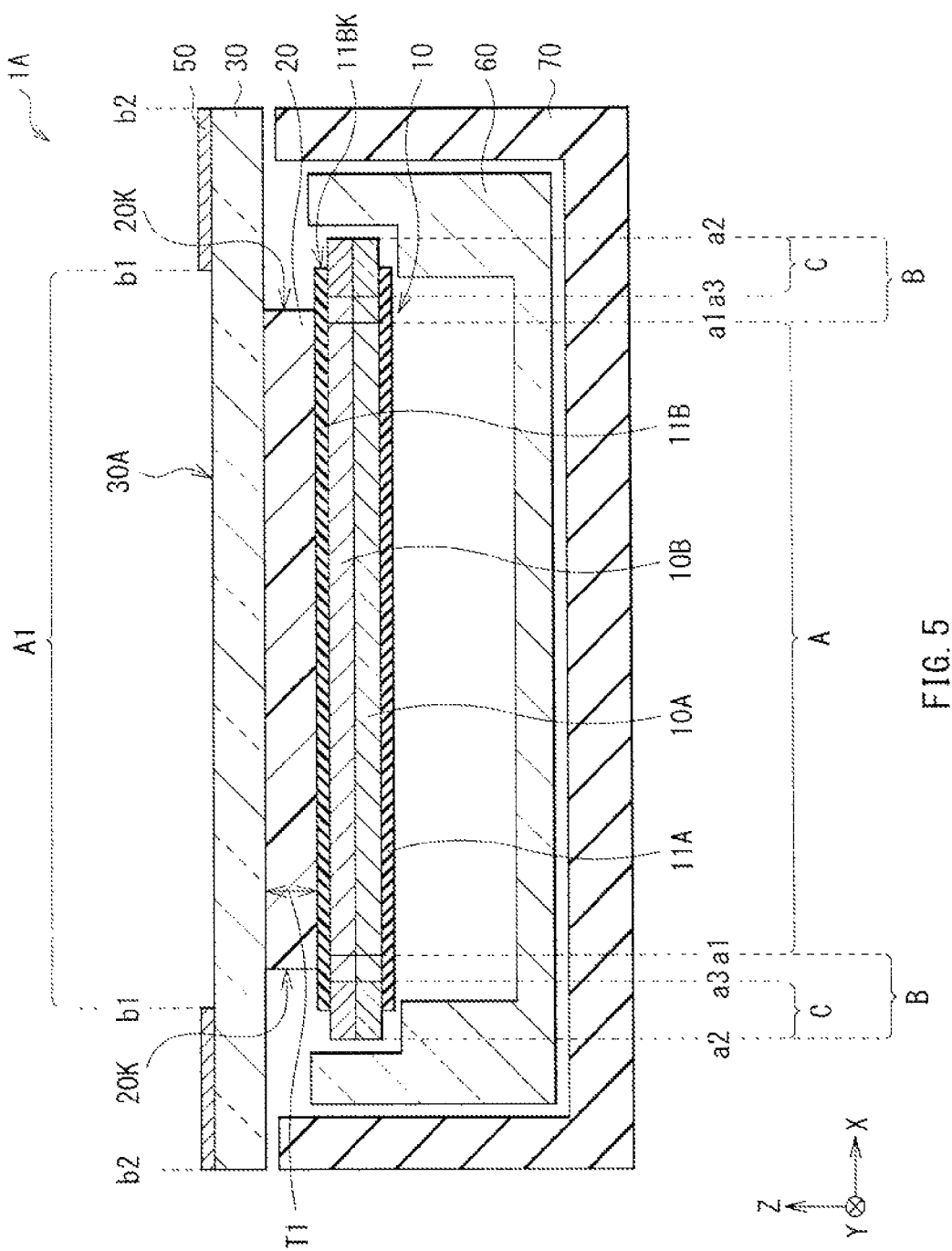
FIG. 5 is a cross-sectional view showing a first modification of the display unit in FIG. 1.

FIG. 5 shows a cross-sectional configuration of a primary part of a display unit 1A according to a first modification of the display unit 1 described above in the first embodiment. The display unit 1A has substantially the same configuration as the display unit 1, except that an outer edge 20K of a resin layer 20 is positioned on the inner side of an outer edge 11BK of a polarizing plate 11B.

(Function and Effect of Display Unit 1A)

When the outer edge 20K of the resin layer 20 sandwiched between the polarizing plate 11B and a transparent substrate 30 is positioned on the inner side of the outer edge 11BK of the polarizing plate 11B as in this modification, a thickness T1 of the resin layer 20 becomes uniform. It is accordingly possible for the display unit 1A to reduce the nonuniformity of the shrinkage of the resin 21 when a resin 21 is cured to from the resin layer 20, in comparison with a case where the resin layer 20 has regions of the thicknesses T1 and T2 as in the display unit 1, thus better reducing stress generated in the resin layer 20. Consequently, the display unit 1A is suitable for a further slim design of a display panel 10 and the transparent substrate 30.

Second Modification of First Embodiment (Configuration of Display Unit 1B)

Figure 6:
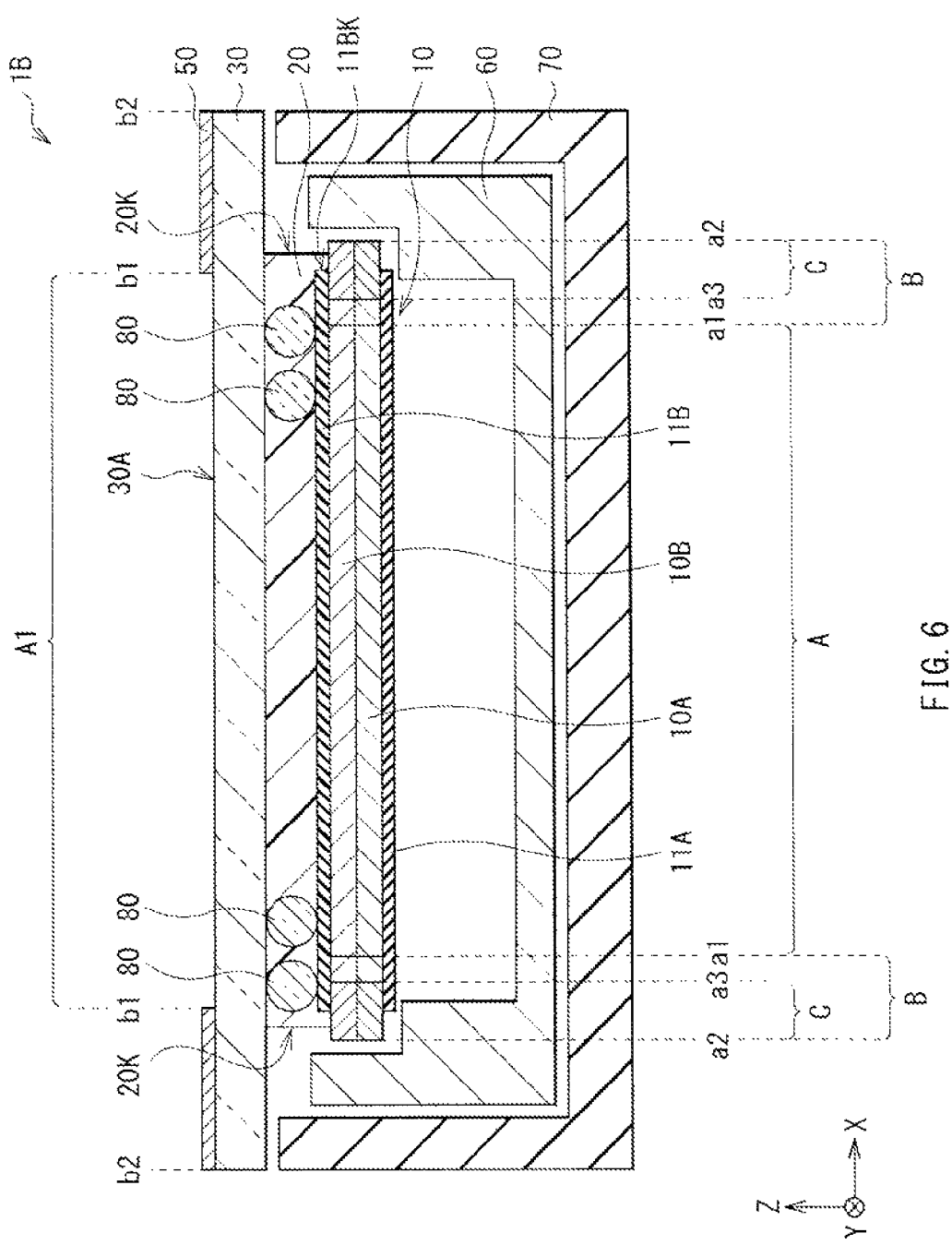
FIG. 6 is a cross-sectional view showing a second modification of the display unit in FIG. 1.

FIG. 6 shows a cross-sectional configuration of a primary part of a display unit 1B according to a second modification of the display unit 1 described above in the first embodiment. The display unit 1B has substantially the same configuration as the display unit 1, except that a resin layer 20 contains a plurality of spacers 80 formed, for example, in a spherical shape. Each spacer 80 may preferably be made of, for example, transparent resin or glass, and has a diameter corresponding to the thickness of the resin layer 20. The number of spacers 80 and their arrangement locations are not limited to those in FIG. 6. Therefore, the spacers 80 may be arranged throughout the resin layer 20. However, the spacers 80 may desirably be arranged only in a surrounding region B of the resin layer 20, so that it is possible to reliably avoid the visual perception of the spacers 80 present in the display region A and to decrease a cost. In order to allow the spacers 80 to be contained only in the surrounding region B of the resin layer 20, for example, a liquid resin 21 may be applied evenly to a surface of a polarizing plate 11B, and then the spacers 80 may be placed only at the periphery of a film made of the uncured resin 21.

(Function and Effect of Display Unit 1B)

Allowing the spacers 80 to be contained in the resin layer 20 in this manner makes it possible to prevent the resin 21 from protruding from the edge of the display panel 10, when a transparent substrate 30 is pressed toward a display panel 10 in order to bond the display panel 10 to the transparent substrate 30 with the resin 21 therebetween. Desirably, a process for bonding the display panel 10 to the transparent substrate 30 may be performed in a vacuum, so that air bubbles are prevented from being created in the resin layer 20. Alternatively, if the process is performed in the atmosphere, preferably the transparent substrate 30 may be curved, and the curved transparent substrate 30 is partially pressed toward the display panel 10 and bonded thereto while the pressed part is sequentially changed from one end to the other end. In this case, there is a risk of protruding the resin 21 from the edge of the display panel 10, but allowing the spacers 80 to be contained in the uncured resin 21 successfully reduces this risk. Furthermore, the presence of the spacers 80 enables the distance between the display panel 10 and the transparent substrate 30 to be made more uniform.

Third Modification of First Embodiment (Configuration of Display Unit 1C)

Figure 7:
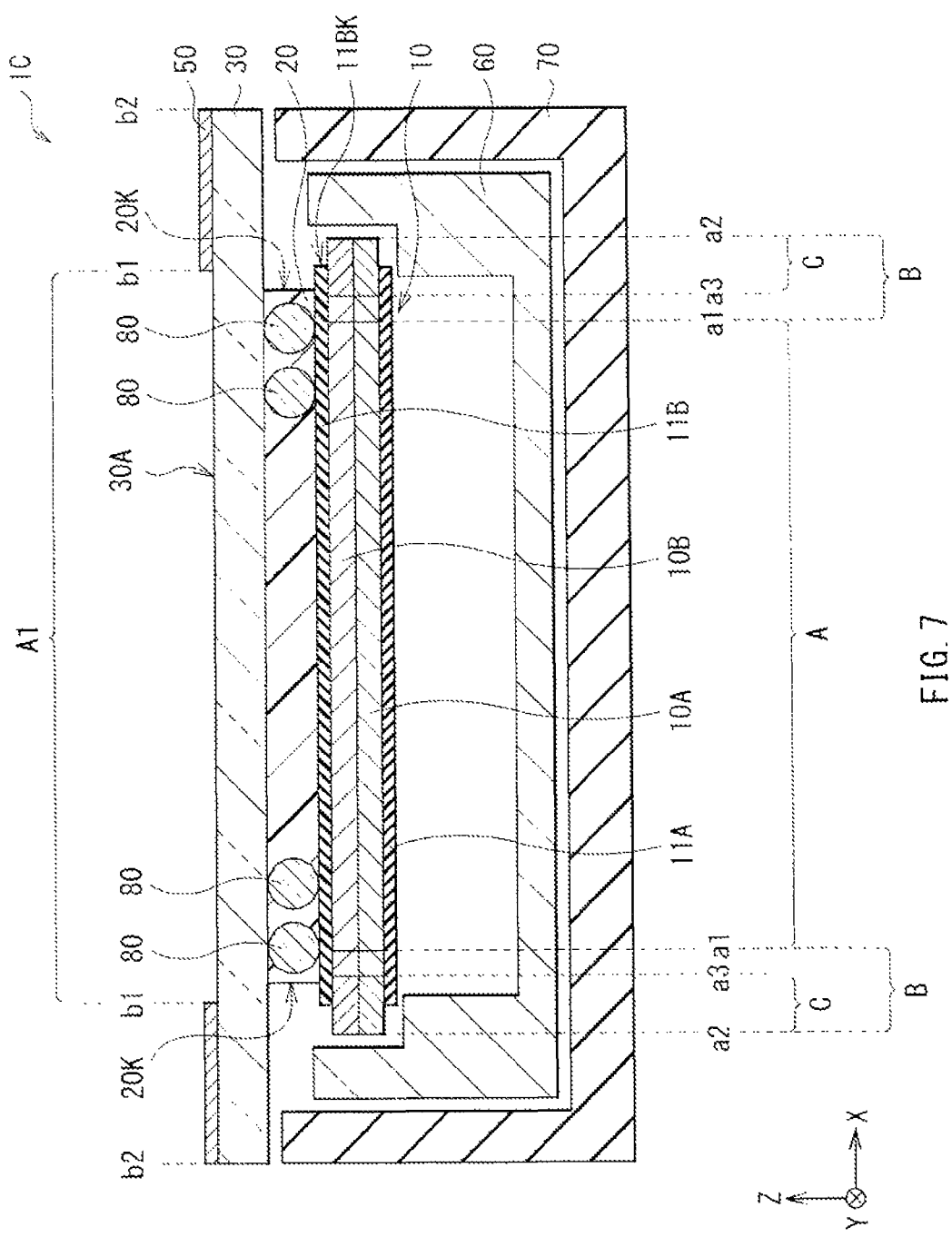
FIG. 7 is a cross-sectional view showing a third modification of the display unit in FIG. 1.

FIG. 7 shows a cross-sectional configuration of a primary part of a display unit 1C according to a third modification of the display unit 1 described above in the first embodiment. The display unit 1C has substantially the same configuration as the display unit 1, except that an outer edge 20K of a resin layer 20 is positioned on the inner side of an outer edge 11BK of a polarizing plate 11B and the resin layer 20 contains a plurality of spacers 80 formed, for example, in a spherical shape.

(Function and Effect of Display Unit 1C)

The resin layer 20 in the display unit 1C has a uniform thickness T1, which enables stress generated in the resin layer 20 to be better reduced. Moreover, the presence of the spacers 80 makes it possible to prevent a resin 21 from protruding from the edge of the display panel 10 when the display panel 10 is bonded to the transparent substrate 30, and to equalize the distance between the display panel 10 and the transparent substrate 30. Consequently, the display unit 1C is suitable for a further slim design of the display panel 10 and a transparent substrate 30.

Second Embodiment (Configuration of Display Unit 2)

Figure 8:
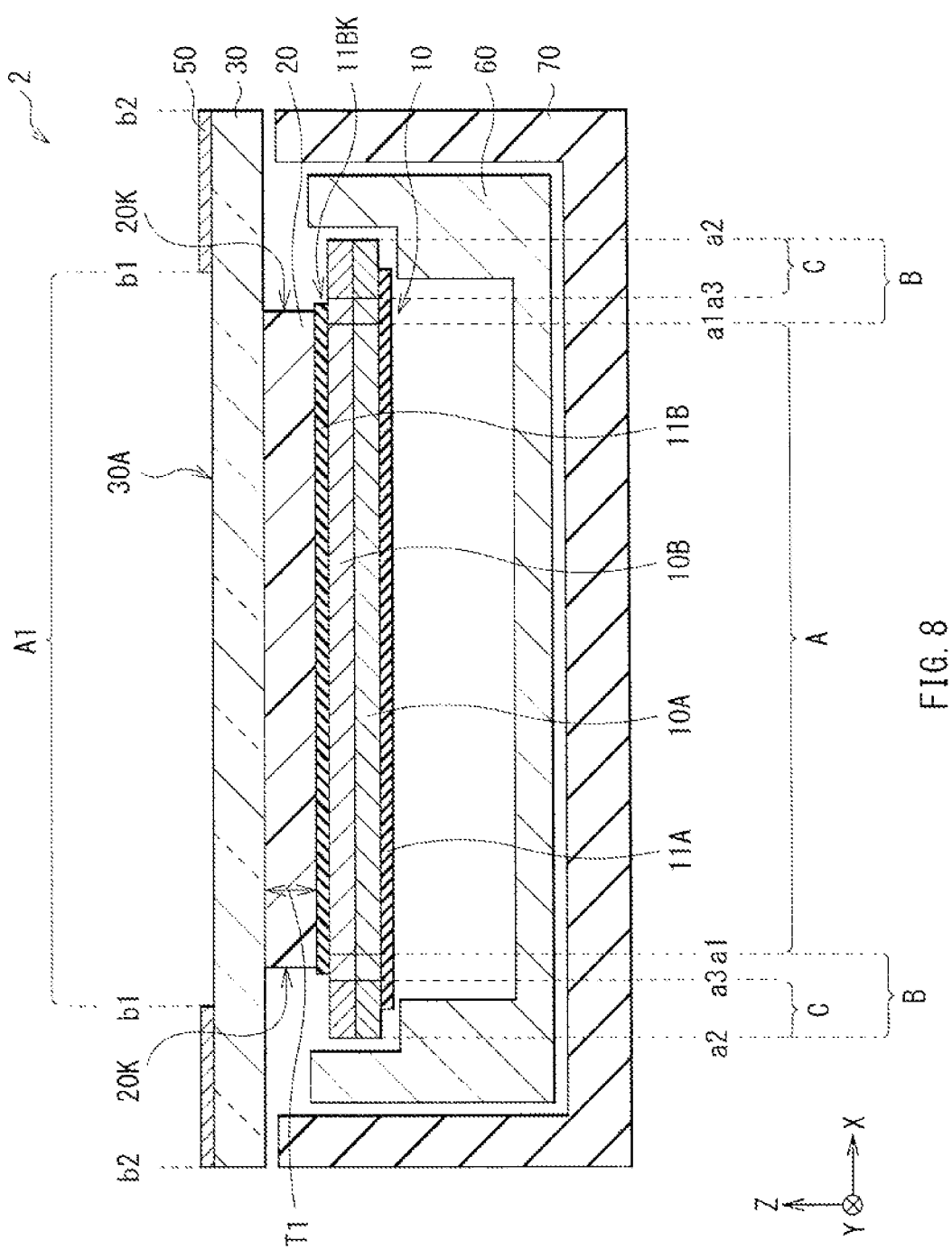
FIG. 8 is a cross-sectional view showing a configuration of a display unit according to a second embodiment of the present disclosure.

FIG. 8 shows a cross-sectional configuration of a primary part of a display unit 2 according to a second embodiment of the present technology. In the display unit 2, a resin layer 20 has an outer edge 20K positioned on the inner side of an outer edge 11BK of a polarizing plate 11B. Specifically, for example, the outer edge 11BK is positioned in a region other than a seal region C in a surrounding region B. Except for these features, the display unit 2 has substantially the same configuration as the display unit 1 described above in the first embodiment. The outer edge 11BK may be positioned over the seal region C, in which case the configuration of the display unit 2 becomes substantially the same as that of the display unit 1A described above (FIG. 5).

(Function and Effect of Display Unit 2)

In the display unit 2 configured above, the outer edge 20K of the resin layer 20 sandwiched between the polarizing plate 11B and a transparent substrate 30 is positioned on the inner side of the outer edge 11BK of the polarizing plate 11B, so that the resin layer 20 has a uniform thickness T1. It is therefore possible for the display unit 2 to reduce the nonuniformity of the shrinkage of the resin 21 when a resin 21 is cured to form the resin layer 20, in comparison with the case where the resin layer 20 has regions of thicknesses T1 and T2 as in the display unit 1, thus better reducing stress generated in the resin layer 20. Consequently, the display unit 2 is suitable for a further slim design of the display panel 10 and the transparent substrate 30.

Modification of Second Embodiment

Figure 9:
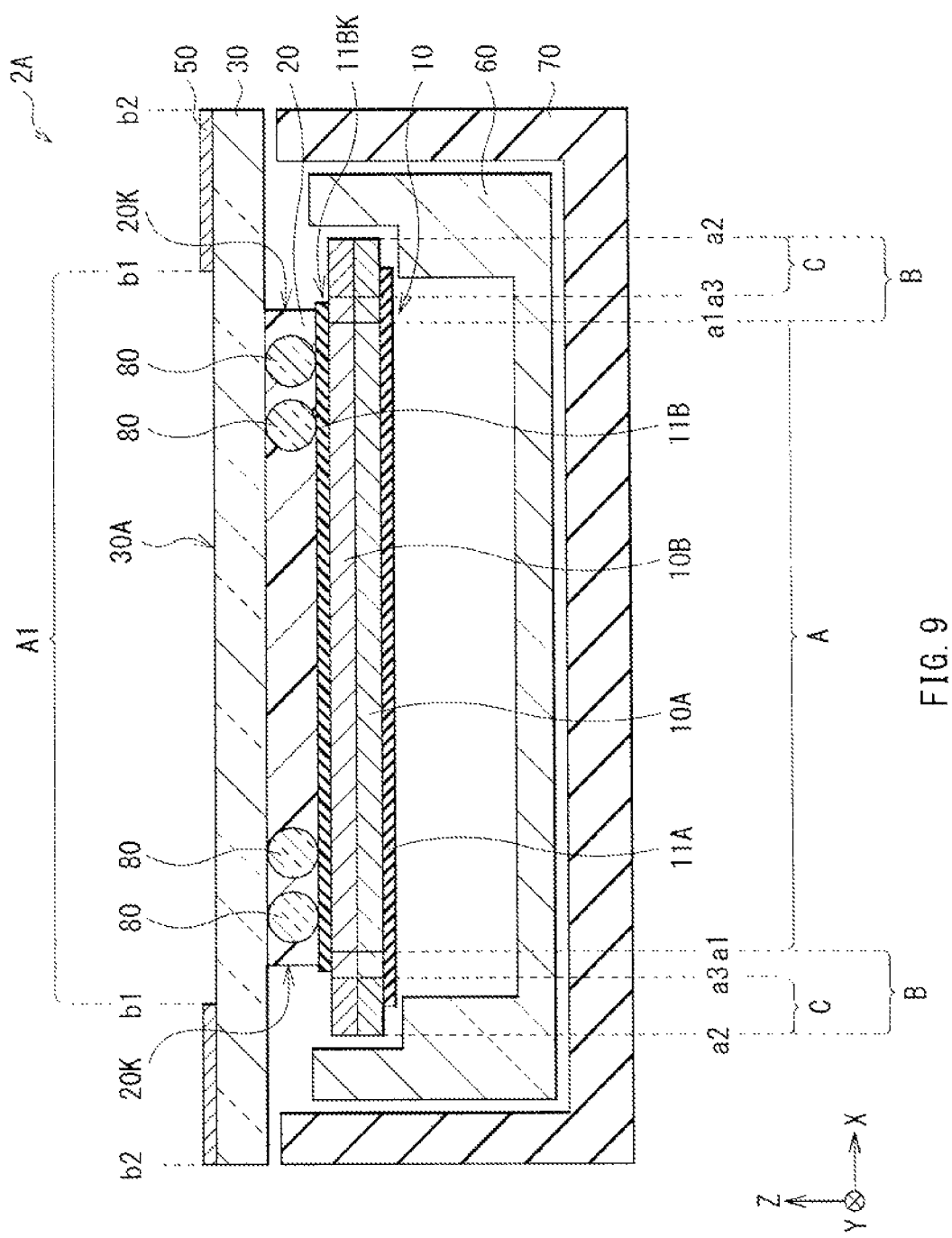
FIG. 9 is a cross-sectional view of a modification of the display unit in FIG. 8.

A display unit 2A shown in FIG. 9 has substantially the same configuration as the display unit 2, except that, for example, the plurality of spacers 80 in the display unit 1B shown in FIG. 9 are contained in the resin layer 20 in the display unit 2. The presence of the spacers 80 makes it possible to prevent a resin 21 from protruding from the edge of the display panel 10 when a display panel 10 is bonded to a transparent substrate 30, and to better equalize the distance between the display panel 10 and the transparent substrate 30.

3. EXAMPLE

Specific Examples of the present disclosure will be described below; however the present technology is not limited to Examples.

Experimental Examples 1-1 to 1-3

The display units 1A (FIG. 5) that have been described as the first modification of the first embodiment were fabricated. Specific manufacturing procedures will be described below.

First, the display panels 10 with a screen size of 55 inches in diagonal length, which contained a VA type of transmissive liquid crystal, were prepared. Each display panel 10 was provided with the surrounding region B having a width of 8 mm around the display region A. The surface of each display panel 10 was provided with the polarizing plate 11A having a thickness of 150 μm. A region of each display panel 10 which spanned inwardly from the outer edge a2 by 2 mm was defined as the seal region C. Then, the transparent substrate 30 was stacked on each display panel 10 with the ultraviolet light curing resin 21 having a thickness of 70 μm therebetween. The resin 21 used had a cure shrinkage ratio of 2.5% and a storage elasticity modulus of $1.2 \times 10^{-5}$ Pa at ambient temperature; the transparent substrate 30 used was a chemically toughened glass having a thickness of 0.7 mm. Following this, the front surface 30A and side surface 30B of each transparent substrate 30 were irradiated with ultraviolet light, so that the resin 21 is cured to form the resin layer 20. In this case, the irradiation light source used was a metal halide lamp that had high light emission peaks at 365 nm and 405 nm, and the irradiance and irradiation time were set to 100 mW/cm$^2$ and 1 minute, respectively. The distances between the outer edges a2 and the outer edges 20K and between the outer edges a2 and the outer edges 11BK were set as shown in Table 1.

TABLE 1

| | | | | | | |
|---|---|---|---|---|---|---|
| | | DISPLAY PANEL SIZE: 55 INCHES | | | | |
| | Corresponding Structure | Distance of Outer edges a2 and 20K [mm] | Distance of Outer edges a2 and 11BK [mm] | Spacer | Strain on Transparent Substrate | Display Unevenness |
| Experimental Example 1-1 | FIG. 5 | 2.0 | 1.0 | none | good | good |
| Experimental Example 1-2 | FIG. 5 | 3.0 | 2.0 | none | good | good |
| Experimental Example 1-3 | FIG. 5 | 4.0 | 3.0 | none | good | good |
| Experimental Example 1-4 | FIG. 7 | 2.0 | 1.0 | 70 μm | good | good |
| Experimental Example 1-5 | FIG. 7 | 3.0 | 2.0 | 70 μm | good | good |
| Experimental Example 1-6 | FIG. 7 | 4.0 | 3.0 | 70 μm | good | good |
| Experimental Example 1-7 | FIG. 1 | 0.0 | 0.5 | none | good | good |

TABLE 1-continued

DISPLAY PANEL SIZE: 55 INCHES

| | Corresponding Structure | Distance of Outer edges a2 and 20K [mm] | Distance of Outer edges a2 and 11BK [mm] | Spacer | Strain on Transparent Substrate | Display Unevenness |
|---|---|---|---|---|---|---|
| Experimental Example 1-8 | FIG. 1 | 0.5 | 1.0 | none | good | good |
| Experimental Example 1-9 | FIG. 1 | 0.5 | 1.5 | none | good | good |
| Experimental Example 1-10 | FIG. 1 | 1.0 | 1.5 | none | good | good |
| Experimental Example 1-11 | FIG. 10 | 0.5 | 2.5 | none | poor | poor |
| Experimental Example 1-12 | FIG. 10 | 1.0 | 3.0 | none | poor | poor |
| Experimental Example 1-13 | FIG. 10 | 1.5 | 4.0 | none | poor | poor |
| Experimental Example 1-14 | FIG. 10 | 2.0 | 5.0 | none | poor | poor |

Experimental Examples 1-4 to 1-6

The display units 1C (FIG. 7) that have been described as the third modification of the first embodiment were fabricated. In this case, these examples were fabricated in the same manner as in Experimental Examples 1-1 to 1-3 described above, except that spherical spacers 80 having a diameter of 70 μm were allowed to be contained in each resin layer 20.

Experimental Examples 1-7 to 1-10

The display units 1 that have been described as the first embodiment (FIG. 1) were fabricated. In this case, these examples were fabricated in the same manner as in Experimental Examples 1-1 to 1-3 described above, except that the distances between the outer edges a2 and the outer edges 20K and between the outer edges a2 and the outer edges 11BK were set as shown in Table 1.

Experimental Examples 1-11 to 1-14

The display units 101 (FIG. 10) that have been described as the comparative example of the first embodiment were fabricated. In this case, these examples were fabricated in the same manner as in Experimental Examples 1-1 to 1-3 described above, except that the distances between the outer edges a2 and the outer edges 20K and between the outer edges a2 and the outer edges 11BK were set as shown in Table 1.

Experimental Examples 2-1 to 2-14

These examples were fabricated in the same manner as in Experimental Examples 1-1 to 1-14 described above, except that the display panel 10 had a screen size of 65 inches in diagonal length. The distances between the outer edges a2 and the outer edges 20K and between the outer edges a2 and the outer edges 11BK were set as shown in Table 2.

TABLE 2

DISPLAY PANEL SIZE: 65 INCHES

| | Corresponding Structure | Distance of Outer edges a2 and 20K [mm] | Distance of Outer edges a2 and 11BK [mm] | Spacer | Strain on Transparent Substrate | Display Unevenness |
|---|---|---|---|---|---|---|
| Experimental Example 2-1 | FIG. 5 | 2.0 | 1.0 | none | good | good |
| Experimental Example 2-2 | FIG. 5 | 3.0 | 2.0 | none | good | good |
| Experimental Example 2-3 | FIG. 5 | 4.0 | 3.0 | none | good | good |
| Experimental Example 2-4 | FIG. 7 | 2.0 | 1.0 | 70 μm | good | good |
| Experimental Example 2-5 | FIG. 7 | 3.0 | 2.0 | 70 μm | good | good |
| Experimental Example 2-6 | FIG. 7 | 4.0 | 3.0 | 70 μm | good | good |
| Experimental Example 2-7 | FIG. 1 | 0.0 | 0.5 | none | good | good |
| Experimental Example 2-8 | FIG. 1 | 0.5 | 1.0 | none | good | good |
| Experimental Example 2-9 | FIG. 1 | 0.5 | 1.5 | none | good | good |
| Experimental Example 2-10 | FIG. 1 | 1.0 | 1.5 | none | good | good |

TABLE 2-continued

DISPLAY PANEL SIZE: 65 INCHES

|  | Corresponding Structure | Distance of Outer edges a2 and 20K [mm] | Distance of Outer edges a2 and 11BK [mm] | Spacer | Strain on Transparent Substrate | Display Unevenness |
|---|---|---|---|---|---|---|
| Experimental Example 2-11 | FIG. 10 | 0.5 | 2.5 | none | poor | poor |
| Experimental Example 2-12 | FIG. 10 | 1.0 | 3.0 | none | poor | poor |
| Experimental Example 2-13 | FIG. 10 | 1.5 | 4.0 | none | poor | poor |
| Experimental Example 2-14 | FIG. 10 | 2.0 | 5.0 | none | poor | poor |

It was checked whether or not strain on the front surfaces 30A of the transparent substrates 30 and display unevenness were present in the resultant display units of Examples. The results are shown in Tables 1 and 2. In Tables 1 and 2, "good" indicates that no defective was observed, and "poor" indicates that a defective was prominent and the appearance and image had poor qualities.

As shown in Tables 1 and 2, strain on the front surfaces 30A of the transparent substrates 30 and display unevenness were not perceived in Examples 1-1 to 1-10 and 2-1 to 2-10. Therefore, it has been confirmed that the present technology provides a display unit that suppresses the generation of display unevenness and strain on a surface of a front plate.

Up to this point, the embodiments of the present disclosure and their modifications have been described; however the present disclosure is not limited to these embodiments and the like, and may be modified and varied in various manners. For example, the material and thickness of each layer are not limited to those described in the embodiments and the like, and other material and thickness may be employed.

The embodiments and the like of the present disclosure have been described regarding the case where a liquid crystal display panel is used as the display panel 10; however the present disclosure is still effective when the display panel 10 is applied to organic electroluminescence (EL) panels, plasma display panels, and other types of display panels. Thus, even when any one of the above types of display panels is used as the display panel 10, it is possible to avoid the deterioration of an image quality by reducing strain on the transparent substrate 30 disposed in front of the display panel 10.

Furthermore, the technology encompasses any possible combination of some or all of the various embodiments described herein and incorporated herein.

It is possible to achieve at least the following configurations from the above-described example embodiments of the disclosure.

(1) A display unit including:
a display panel having a pair of substrates, the substrates being bonded to each other in a seal region along an outer edge of the display panel;
a transparent plate facing the display panel;
an optical film provided on a surface of the display panel which faces the transparent plate, and having an outer edge positioned over the seal region; and
a resin layer sandwiched between the optical film and the transparent plate.

(2) The display unit according to (1), wherein the resin layer covers the outer edge of the optical film.

(3) The display unit according to (1) or (2), wherein the resin layer contains a particle-shaped spacer having a diameter corresponding to a thickness of the resin layer.

(4) A display unit including:
a display panel;
a transparent plate facing the display panel;
an optical film provided on a surface of the display panel which faces the transparent plate; and
a resin layer sandwiched between the optical film and the transparent plate, and having an outer edge positioned on inner side of an outer edge of the optical film.

(5) The display unit according to (4), wherein
the display panel has a pair of substrates, the substrates being bonded to each other in a seal region along an outer edge of the display panel, and
the outer edge of the optical film is positioned over the seal region.

(6) The display unit according to (4) or (5), wherein the resin layer contains a particle-shaped spacer having a diameter corresponding to a thickness of the resin layer.

(7) The display unit according to any one of (1) to (6), wherein the display panel has a plurality of pixels, 3840 or more of the pixels being arranged in a first direction, and 2160 or more of the pixels being arranged in a second direction.

(8) The display unit according to (7), wherein each of the pixels includes a first sub-pixel, a second sub-pixel, and a third sub-pixel, the first sub-pixel emitting red light, the second sub-pixel emitting green light, the third sub-pixel emitting blue light.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit comprising:
a display panel having a pair of substrates, the substrates being bonded to each other in a seal region facing an outer edge of the display panel;
a transparent plate facing the display panel;
an optical film provided on a surface of the display panel which faces the transparent plate, and having an outer edge positioned over the seal region; and
a resin layer sandwiched between the optical film and the transparent plate,
in which at least one of (i) a portion of a surface of the seal region facing the transparent plate is uncovered by the resin layer or (ii) the resin layer contains a particle-shaped spacer having a diameter, and a thickness of the resin layer extending from the optical film to the transparent plate is the diameter of the spacer.

2. The display unit of claim 1, wherein a portion of the resin layer extends from the seal region.

3. The display unit of claim 1, wherein a portion of the surface of the display panel facing the transparent plate is uncovered by the optical film.

4. The display unit according to claim 1, wherein the resin layer covers the outer edge of the optical film.

5. The display unit according to claim 1, wherein the display panel has a plurality of pixels, 3840 or more of the pixels being arranged in a first direction, and 2160 or more of the pixels being arranged in a second direction.

6. The display unit according to claim 5, wherein each of the pixels includes a first sub-pixel, a second sub-pixel, and a third sub-pixel, the first sub-pixel emitting red light, the second sub-pixel emitting green light, the third sub-pixel emitting blue light.

7. A display unit comprising:
a display panel
a transparent plate facing the display panel;
an optical film overlying a surface of the display panel which faces the transparent plate; and
a resin layer sandwiched between the optical film and the transparent plate, and having an outer edge positioned on an inner side of an outer edge of the optical film, in which a portion of a surface of the optical film which faces the transparent plate is uncovered by the resin layer,
in which the resin layer contains a particle-shaped spacer having a diameter, and a thickness of the resin layer extending from the optical film to the transparent plate is the diameter of the spacer.

8. The display unit according to claim 7, wherein
the display panel has a pair of substrates, the substrates being bonded to each other in a seal region facing an outer edge of the display panel, and
the outer edge of the optical film is positioned between an inner edge of the seal region and an outer edge of the display panel.

9. A display unit comprising:
an organic electroluminescence display panel having a pair of substrates, the substrates being bonded to each other in a seal region along an outer edge of the organic electroluminescence display panel;
a transparent plate facing the display panel;
an optical film provided on a surface of the organic electroluminescence display panel which faces the transparent plate, and having an outer edge positioned over the seal region;
a light-shielding layer provided on the surface of the organic electroluminescence display panel; and
a resin layer sandwiched between the optical film and the transparent plate,
wherein the organic electroluminescence display panel includes a display region and a peripheral region having the seal region, and
wherein an inner edge of the light-shielding layer is positioned on an outer side of a boundary between the display region and the peripheral region in the organic electroluminescence display panel.

10. The display unit according to claim 9, wherein the resin layer covers the outer edge of the optical film.

11. The display unit according to claim 9, wherein the resin layer contains a particle-shaped spacer having a diameter corresponding to a thickness of the resin layer.

12. The display unit according to claim 9, wherein the organic electroluminescence display panel has a plurality of pixels, 3840 or more of the pixels being arranged in a first direction, and 2160 or more of the pixels being arranged in a second direction.

13. The display unit according to claim 12, wherein each of the pixels includes a first sub-pixel configured to emit red light, a second sub-pixel configured to emit green light, and a third sub-pixel configured to emit blue light.

14. A display unit comprising:
an organic electroluminescence display panel;
a transparent plate facing the organic electroluminescence display panel;
an optical film provided on a surface of the organic electroluminescence display panel which faces the transparent plate;
a light-shielding layer provided on the surface of the organic electroluminescence display panel; and
a resin layer sandwiched between the optical film and the transparent plate, and having an outer edge positioned on an inner side of an outer edge of the optical film,
wherein the organic electroluminescence display includes a display region and a peripheral region having the seal region, and
wherein an inner edge of the light-shielding layer is positioned on an outer side of a boundary between the display region and the peripheral region in the organic electroluminescence display panel.

15. The display unit according to claim 14, wherein the organic electroluminescence display panel has a pair of substrates, the substrates being bonded to each other in a seal region along an outer edge of the organic electroluminescence display panel, and the outer edge of the optical film is positioned over the seal region.

16. The display unit according to claim 14, wherein the resin layer contains a particle-shaped spacer having a diameter corresponding to a thickness of the resin layer.

17. The display unit according to claim 14, wherein the organic electroluminescence display panel has a plurality of pixels, 3840 or more of the pixels being arranged in a first direction, and 2160 or more of the pixels being arranged in a second direction.

18. The display unit according to claim 17, wherein each of the pixels includes a first sub-pixel configured to emit red light, a second sub-pixel configured to emit green light, and a third sub-pixel configured to emit blue light.

* * * * *